Dec. 9, 1930.                F. W. ROGERS                1,784,753
                        ELECTRIC OVEN CONSTRUCTION
                           Filed July 30, 1928
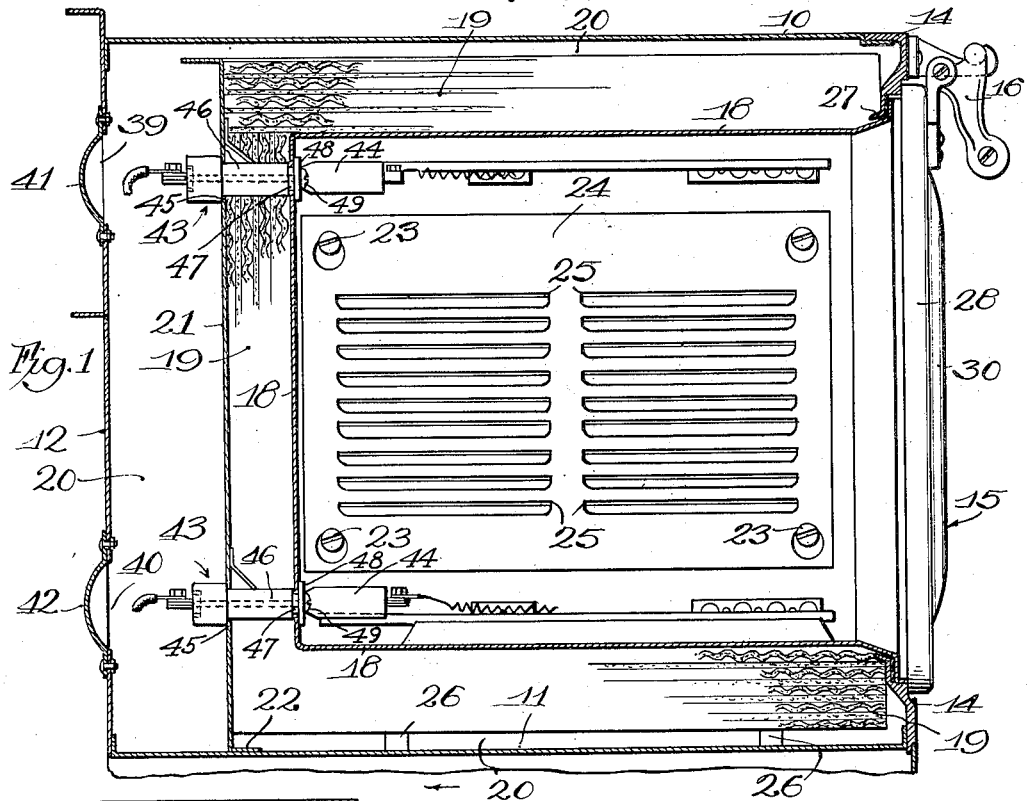
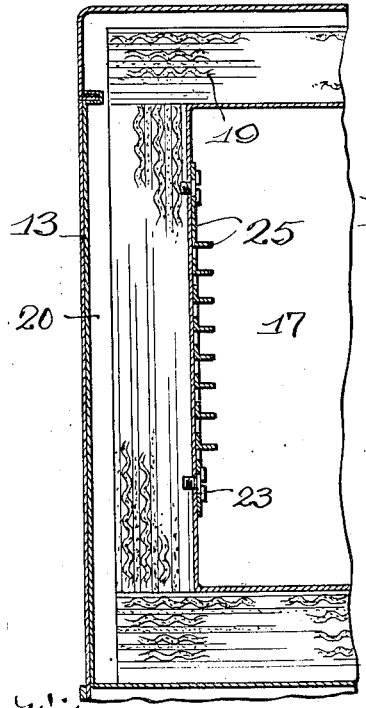
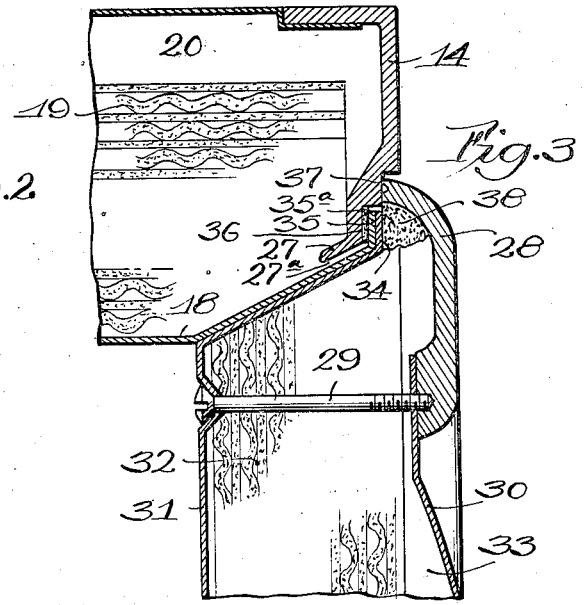
Witness:
Chas. R. Koursh.
Inventor,
Frederick W. Rogers
George Bayard Jones, Atty.

Patented Dec. 9, 1930

1,784,753

UNITED STATES PATENT OFFICE

FREDERICK W. ROGERS, OF BEAVER DAM, WISCONSIN, ASSIGNOR TO MALLEABLE IRON RANGE COMPANY, A CORPORATION OF WISCONSIN

ELECTRIC OVEN CONSTRUCTION

Application filed July 30, 1928. Serial No. 296,304.

This invention relates to improvements in electric oven construction, and circuit closing contact means therefor.

The principal object of the invention is to provide an oven having a baking compartment which is well insulated on all sides from the outer oven casing and from the oven door, the insulating material being spaced from said casing by air spaces to further retard the loss of heat through the casing.

A further specific object of the invention is to provide an insulated oven door which effectually prevents the escape of heat from the oven by conduction through the metal portion of the door.

Another object of the invention is to provide improved readily separable electric contact plug members having large contacting surfaces, the stationary part of said members being mounted in an opening in the insulating material of the oven.

A further object relates to the arrangement of the separable plug portions whereby the electric contact is made at a point exterior of the baking chamber and thus not exposed to the greatest heat of the oven.

A still further object of the invention is to provide securing means for the receptacle or stationary portion of the contact member which means forms a steam tight seal between the wall of the baking chamber and the stationary plug member.

Other objects of the invention relate to various features of construction and arrangement of parts which will be apparent from a consideration of the following specification and accompanying drawings, wherein:

Fig. 1 is a vertical sectional view taken longitudinally through an oven embodying the present improvements;

Fig. 2 is a broken vertical sectional view through one side wall of the oven;

Fig. 3 is an enlarged broken sectional view through the upper portion of the oven, and upper portion of the oven door.

In the drawings, 10 indicates the top outer wall of the oven casing, 11 the bottom wall. The oven is also provided with a rear wall 12 and side walls 13, one of which is shown in Fig. 2. The front of the oven is provided with a metal frame 14 surrounding the oven opening which is adapted to be closed by a suitable door 15 which may be hinged adjacent the bottom (the hinges not being shown) and is provided with suitable locking means 16 at the top.

The baking chamber which is indicated by the numeral 17 is defined by a metal lining comprising upper and lower walls, side walls, and rear wall, each indicated by the numeral 18. Between the walls 18 and the corresponding walls of the casing is positioned insulating material 19, the outer surface of which is spaced from the said outer walls to provide air spaces 20. Between the back wall 12 and the adjacent insulating material is positioned a sub-back panel or wall 21 which may have its lower edge turned over to form a flange 22 which rests upon the lower wall 11 of the casing. The side walls 18 are provided with a number of screws 23 which removably support the plates 24 which are provided with horizontally disposed flanges 25 forming pan slides.

The insulated oven chamber rests upon transverse spacing strips 26, shown in Fig. 1 to space the same from the bottom of the outer casing as above mentioned. The frame 14 has an inwardly stepped surface, as shown in Fig. 1, and terminates in a flaring flange 27 spaced as shown at 27$^a$ from the upper, lower and side walls 18 of the oven lining.

The door 15 is provided with a rim 28, as shown in Fig. 3, to which is secured, as by screws 29, the convex panel 30. The door is provided with a lining 31, between which and the rim 28 and panel 30, is a layer of heat insulating material 32, similar to the insulating material previously described. The layer of material 32 is likewise spaced slightly from the rim 28 and the panel 30, to provide an insulating air space 33. The lining 31 flares outwardly at the margin of the door and terminates in a flange 34 which, when the door is closed, overlies a corresponding flange 35 of lining member 18, between which latter flanges and the vertical faces 36 of the stepped portion of the frame 14 is a gasket 35$^a$ which prevents heat conduction from the lining 31 to the frame 14.

The top of the rim 28 contacts with the other stepped face 37 of the frame when the door is closed, as shown in Fig. 3.

By this construction, as will be noted, the door opening is flaring, as are also the edges of the door, which flaring surfaces closely contact when the door is closed, thus providing a very tight structure which reduces the escape of heat. The contacting flanges 34 and 35 also cooperate in closely sealing the oven opening when the door is closed. It will be noted that the flange 34 lies out of contact with the rim member 28, thus preventing the conduction of heat from the flange to the rim. A suitable packing or gasket 38 is provided between the flange 34 and adjacent portions of the rim to further insulate the door at these points. It will be understood that the construction shown in Fig. 3 obtains on the remaining sides of the door also.

The back wall 12 of the outer casing is provided with openings 39 and 40, which may be closed by the members 41 and 42. The openings, when the covers 41 and 42 are removed, provide access to the outer ends of the upper and lower stationary portions of the electrical connectors which are indicated generally by the numerals 43. As shown in Fig. 1, the rear insulation 19 and the rear wall 18 of the oven lining and sub-back 21 are provided with openings for accommodating the connector receptacles 43 with which cooperates the removable plugs 44 which can be detached from the interior of the oven. The receptacle 43 has a shoulder 45 which abuts the sub-back 21 and a reduced body portion 46 which extends through openings in the sub-back while the further reduced forward end 47 of the receptacle extends through an opening in the wall 18 of the lining. To prevent escape of heated air or steam through the said openings of the wall 18, an apertured plate 48 is positioned over each extension 47 and is secured in position by bolts 49 which pass through longitudinal passages formed in the receptacle 43. The bolts thus hold the plates 48 against the wall 18 to prevent leakage and also secure the lining to the sub-back panel 21 to prevent displacement of the lining during use.

Although I have shown and described certain features of my improvements for the purpose of illustration, it will be seen that various modifications may be made therein without departing from the spirit of the appended claims.

What I claim is:

1. An oven structure provided with an outer casing and a lining, said lining having the forward portions of the top, bottom and side walls thereof flared outwardly at the door opening, said flared portions terminating in flanges, a door for said opening having an outer member and a lining spaced therefrom, said lining having flared portions terminating in a perimetrical flange, said flared portions and flange of said door being respectively adapted to contact closely with the flared portions and flange of said oven lining when said door is closed, and a heat insulating gasket between said outer door member and said perimetrical flange to reduce heat conduction through said flange to the outer surface of the door.

2. An oven structure provided with an outer casing and a lining, said lining having the forward portions of the top, bottom and side walls thereof flared outwardly at the door opening, said flared portions terminating in flanges, a door for said opening having an outer member and a lining spaced therefrom, said lining having flared portions terminating in a perimetrical flange, said flared portions and flange of said door being respectively adapted to contact closely with the flared portions and flange of said oven lining when said door is closed, a heat insulating gasket between said outer door member and said perimetrical flange to reduce heat conduction through said flange to the outer surface of the door, and insulating material between said oven lining and casing and between said door lining and the outer member of the door, said insulating material contacting with the respective flared portions of said lining.

3. An oven structure comprising an outer casing having a door opening in one wall thereof, a casing rim surrounding the opening, said rim having an inwardly stepped portion, a lining for said oven, the top, bottom and side walls of said lining having flared portions terminating in substantially vertical extensions forming a flange, a gasket disposed between said flange and one face of said stepped portion of said casing rim, a door comprising a rim and a panel, and a lining for said door spaced from said door rim and panel, said lining having a flared portion terminating in a perimetrical flange, said flared portions of said oven and door linings and said lining flanges being arranged to contact closely when said door is closed, the free edge of said door rim seating against another face of the stepped portion of said casing rim when the door is in the last named position.

4. An oven structure comprising an outer casing having a door opening in one wall thereof, a casing rim surrounding the opening, said rim having an inwardly stepped portion, a lining for said oven, the top, bottom and side walls of said lining having flared portions terminating in substantially vertical extensions forming a flange, a gasket disposed between said flange and one face of said stepped portion of said casing rim, a door comprising a rim and a panel, a lining for said door spaced from said door rim and panel, said lining having a flared portion terminating in a perimetrical flange, said flared portions of said oven and door linings and said lining flanges being arranged to contact closely when said door is closed, the free edge of said door rim seating against another face of the stepped portion of said casing rim when the door is in the last named position, and a heat insulating member between said perimetrical flange and said door rim.

5. An oven structure having a door opening and a hinged door therefor, said oven having a lining provided with flared portions defining the door opening, a lining for said door having flared portions adapted to seat against said flared portions of said oven lining when said door is closed and heat insulating material between each of said flared portions and the adjacent outer portions of the oven structure to retard the conduction of heat from said flared portions to the respective adjacent outer portions of the oven structure.

6. An oven structure comprising an outer casing having a door in the front wall thereof, a lining in said casing having top, bottom, rear and side walls defining the available baking space, said lining walls being spaced from the corresponding walls of said casing, heat insulating material in said spaces for the top, bottom, side and rear walls of said lining, the forward end of said lining being open to define the door opening, a transverse sub-back panel in said casing spaced from the rear wall thereof for supporting said rear insulating material, and means securing said lining to said panel against displacement within said casing.

7. An oven structure comprising an outer casing having a door frame in the front wall thereof, a lining having top, bottom, rear and side walls defining the available baking space, said lining being spaced from the corresponding walls of said casing, heat insulating material in said spaces surrounding said lining walls, the forward portions of said top, bottom and side walls of said lining overlying portions of said door frame, and heat insulating material between said lining and frame portions to prevent conduction of heat from the former to the latter.

In testimony whereof, I have subscribed my name.

FREDERICK W. ROGERS.